Sept. 6, 1932.    H. LE V. HORNING    1,875,620

INTERNAL COMBUSTION ENGINE

Original Filed April 18, 1921

Inventor
Harry L. Horning
By Brown, Jackson, Boettcher & Dienner
Attys.

Patented Sept. 6, 1932

1,875,620

UNITED STATES PATENT OFFICE

HARRY LE VAN HORNING, OF WAUKESHA, WISCONSIN, ASSIGNOR TO WAUKESHA MOTOR COMPANY, OF WAUKESHA, WISCONSIN, A CORPORATION OF WISCONSIN

INTERNAL COMBUSTION ENGINE

Original application filed April 18, 1921, Serial No. 462,187. Patent No. 1,729,972, dated October 1, 1929. Divided and this application filed September 28, 1929. Serial No. 395,784.

My invention relates to internal combustion engines, and is particularly concerned with the combustion chamber.

This application is divisional of my co-pending application, Serial No. 462,187, filed April 18, 1921, which has matured into Patent No. 1,729,972, issued October 1, 1929, wherein I have set forth improved cylinder head constructions for improving the thermal efficiency and power of the engine. In that case the claim is directed to an Otto-cycle L-head engine in which the combustion chamber is bounded by concave surfaces which merge with curved surfaces of a side pocket in which the valves and ignition means are disposed.

In said parent application I also disclosed a construction of cylinder head having a web or baffle therein between the exhaust valve and the cylinder bore and adapted to direct the incoming fuel mixture into the combustion chamber substantially tangentially to the cylinder wall to create a horizontal swirling of the fuel mixture within the combustion chamber and cylinder. It is this construction to which the claims of the instant application are directed.

My invention is illustrated in the accompanying drawing in which.

Figure 1:
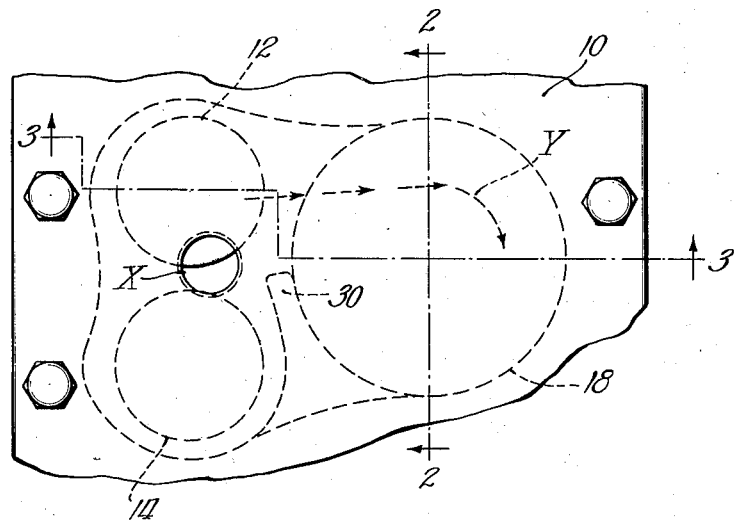
Figure 1 is a fragmentary plan view of one cylinder of an internal combustion engine with the associated parts with which my invention is concerned.
Figure 2:
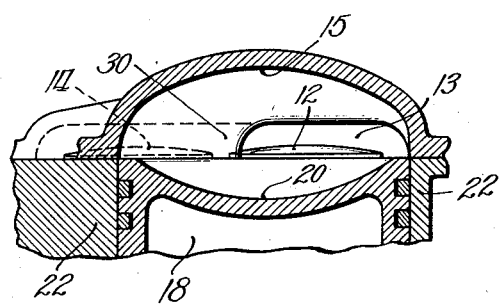
Figure 2 is a vertical sectional view taken on the plane of the line 2—2 of Figure 1, and looking in the direction indicated by the arrows.

In the drawing, the cylinder block 22 provides the cylinder, in which the piston 18 operates, and combustible mixture intake and burned gas outlet passages controlled by the intake valve 12 and exhaust valve 14, respectively. The head 10 overlies the cylinder and passages, as shown, providing the main combustion chambers over the piston, bounded by the complementary concave surfaces 15 and 20, and the side pocket in which the valves operate.

The head 10 is provided with the downwardly projecting web or baffle 30 which lies between the cylinder and the exhaust valve, extending from one side of the combustion chamber but only part way across, leaving the opening 13 directly between the intake passage and the cylinder. The web or baffle 30 extends downwardly to the base of the head, thus forming a wall between the exhaust valve and the cylinder, while the other side of the combustion chamber remains in direct open communication with the intake passage. The dotted arrows Y show the course of the incoming combustible mixture.

Figure 3:
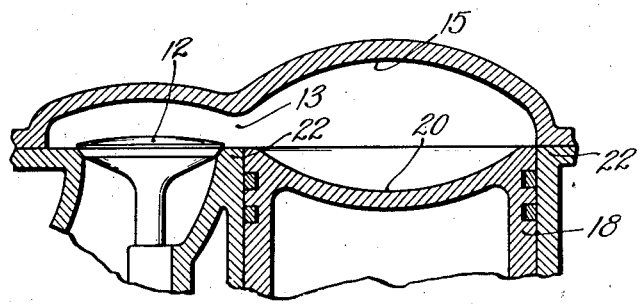
Figure 3 is a vertical sectional view taken on the planes of the line 3—3 of Figure 1, and looking in the direction indicated by the arrows.

As clearly illustrated in Figures 1 and 3, the wall or roof of the head which overlies the valve passages is curved inwardly and downwardly so as to provide the relatively restricted opening 13, which opens into the cylinder substantially tangentially thereof.

The spark plug is preferably placed in the position shown by the threaded opening X.

I claim:

1. In an L-head internal combustion engine, a cylinder block having a cylinder bore therein, a piston reciprocating in said cylinder, combustible gas inlet and burned gas outlet passages formed in said block and terminating similarly adjacent the end of said bore, a head lying over said bore and said inlet and outlet passages, said head having a recess formed therein and lying over said inlet and outlet passages and said bore, a baffle in said recess lying between said bore and said outlet passage, valves for said inlet and outlet passages, and spark ignition means in said recess.

2. In an L-head internal combustion engine, a cylinder block having a cylinder bore therein, a piston reciprocating in said cylinder, combustible gas inlet and burned gas outlet passages formed in said block and terminating similarly adjacent the end of said bore, a head lying over said bore and said inlet and outlet passages, said head having a recess formed therein and lying over said inlet ond outlet passages and said bore, a baffle in said recess depending from said head disposed between said bore and said outlet passage, said baffle coacting with and abutting said cylinder block, valves for said inlet and outlet passages, and spark ignition means in said recess.

3. In an internal combustion engine, a cylinder and intake and exhaust valves, the axes of which are disposed in triangular relation, a chamber over said cylinder and intake and exhaust valves, and a baffle interposed between the portion of said chamber over said cylinder and the exhaust valve.

4. In an L-head internal combustion engine, a cylinder block having a cylinder bore therein and combustible gas inlet and burned gas outlet passages terminating adjacent one end of the bore and adjacent one side thereof, a head overlying said bore and provided with a pocket overlying said passages, valves controlling said passages, a baffle interposed between one of the valves and the cylinder bore, there being an opening between said pocket and the bore adjacent the other valve and disposed substantially tangentially of the cylinder bore, and a piston operating in the cylinder bore.

5. In an L-head internal combustion engine, a cylinder block having a cylinder bore therein and combustible gas inlet and burned gas outlet passages terminating adjacent one end of the bore and adjacent one side thereof, a head overlying said bore and provided with a pocket overlying said passages, valves controlling said passages, a baffle interposed between one of the valves and the cylinder bore, there being an opening between said pocket and the bore adjacent the other valve, and a piston operating in the cylinder bore.

6. In an L-head internal combustion engine, a cylinder block having a cylinder bore therein and combustible gas inlet and burned gas outlet passages terminating adjacent one end of the bore and adjacent one side thereof, a head overlying said bore and provided with a pocket overlying said passages, valves controlling said passages, the portion of the roof of the pocket overlying one of the valves being curved downwardly and inwardly with relation to the cylinder bore, and a piston operating in the bore, there being an opening establishing communication between the valve pocket and the bore.

In witness whereof, I hereunto subscribe my name this 25th day of Sept., 1929.

HARRY LE VAN HORNING.